United States Patent [19]

Delhaes

[11] Patent Number: 4,495,683
[45] Date of Patent: Jan. 29, 1985

[54] ROLLER, IN PARTICULAR TRANSPORT ROLLER

[75] Inventor: Johannes C. Delhaes, Voerendaal, Netherlands

[73] Assignee: Rubber-En Kuststoffabriek Enbi B.V., Voerendaal, Netherlands

[21] Appl. No.: 433,373

[22] Filed: Oct. 8, 1982

[30] Foreign Application Priority Data

Oct. 13, 1981 [DE] Fed. Rep. of Germany ....... 3140546

[51] Int. Cl.³ .............................................. B60B 7/00
[52] U.S. Cl. ...................................... 29/119; 29/123; 29/129
[58] Field of Search ................. 29/117, 118, 119, 123, 29/126–128, 129, 130

[56] References Cited

U.S. PATENT DOCUMENTS

| | | | |
|---|---|---|---|
| 2,031,319 | 2/1936 | Kahn | 29/126 |
| 2,200,758 | 5/1940 | Thaheld | 29/126 |
| 2,636,787 | 4/1953 | Medearis | 29/118 |
| 2,918,867 | 12/1959 | Killary et al. | 29/129 X |
| 3,514,829 | 6/1970 | Blatt | 29/130 |

FOREIGN PATENT DOCUMENTS 561430 4/1957 Italy ..................................... 29/119

Primary Examiner—Howard N. Goldberg
Assistant Examiner—Timothy V. Eley
Attorney, Agent, or Firm—Arthur B. Colvin

[57] ABSTRACT

A roller formed by a spindle and a tubular jacket has elastic sleeves for attachment of the jacket on the spindle. Each elastic sleeve consists either of a clamp-on sleeve fitted on the spindle, a clamp-in sleeve applied concentrically therewith in the jacket, and a rubber ring arranged between the clamping sleeves, or of a sleeve of undulated cross-section whose wave crests directed radially outward bear against the inner wall of the jacket while its wave crests directed radially inward bear against the spindle. Lastly the elastic sleeve may consist of a rim or ring of clamping pins angularly spaced apart which are arranged and fixed at regular intervals distributed over the annular space between jacket and spindle.

1 Claim, 8 Drawing Figures

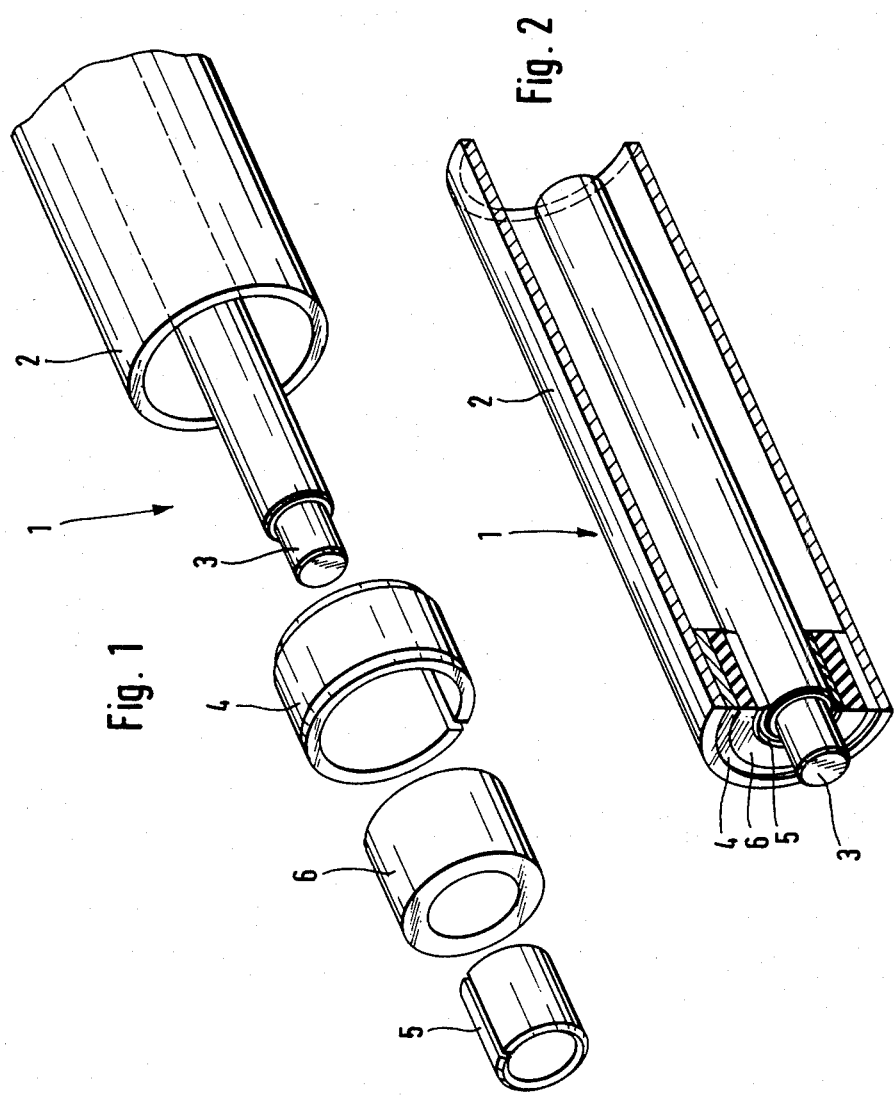

   
Fig. 3a  Fig. 3b  Fig. 3c  Fig. 3d
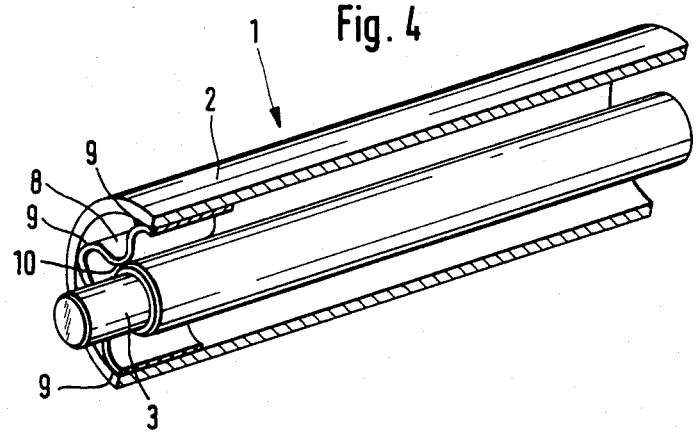
Fig. 4
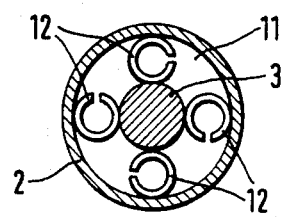
Fig. 5

ROLLER, IN PARTICULAR TRANSPORT ROLLER

The invention relates to a roller, in particular a transport roller, consisting of a spindle and a tubular jacket which is fastened on the spindle by means of elastic sleeves applied at the outer ends or in the vicinity thereof.

In a known design (DE-OS No. 23 44 236), the elastic sleeves consist of two concentric rings, between which elastic shaped bodies are embedded. A non-rotational and non-sliding connection is established between the outer ring and the jacket or between the inner ring and the spindle, for example by means of a force-fit or shrink-fit connection, groove and tongue, wedging, or a glue connection resistant to shear. This construction is used for rollers which, like roller beds in rolling mills, are exposed to heavy loads. Due to this construction the jacket can yield slightly in radial direction relative to the spindle or shaft when impact stresses occur, so that the load application on the bearings is more favorable and the rollers are less subject to wear.

Transport rollers used in transporting or guiding textile material, foil material or paper webs or sheets, e.g. in copiers, do not undergo such heavy load as the rollers of the above described construction. Rollers in copiers, printing presses, textile machines, foil processing machines, etc., on the other hand, should be light, because in these equipments the standstill and movement periods usually alternate rapidly and frequently. Another requirement is that these machines should be light and inexpensive.

In the known transport rollers used in such machines, the outer ends of the jacket each have welded to them a plug with tenon which, being machined from solid material, can be made only at a corresponding cost of labor and waste. Since precise machining of the jacket ends and of the plug is necessary to achieve correct centering of the tenon with respect to the jacket, the manufacture of these transport rollers is very labor-intensive and this construction is accordingly expensive.

It is the object of the invention to provide a sturdy and inexpensive roller which is suitable in particular for use as transport roller in copiers and the like.

Proceeding from the roller described at the outset, it is proposed for the solution of the problem posed to provide a roller which includes a spindle and a jacket, to join these components at the ends with radially expansable sleeve assemblies which are biased outwardly against the inner surface of the jacket and inwardly against the outer surface of the spindle.

According to a development of the invention, each sleeve consists of a clamp-on sleeve applied on the spindle, a clamp-in sleeve applied concentrically thereto in the jacket, and a rubber ring enclosed between these sleeves.

Such clamping sleeves are commercially available in various dimensions, so that expensive machining is not necessary to produce these fastening elements. Clamping sleeves are made of spring steel and are split in lengthwise direction. In clamp-on sleeves the inner surface or end is provided with a beveled "searching" edge, to facilitate the mounting on a spindle. In clamp-in sleeves a beveled searching lead edge is located on the outer surface, to facilitate the mounting in a bore. Further a clamp-on sleeve differs from a clamp-in sleeve in that the slit of the clamp-in sleeve must have a certain width, to permit reducing the clamp-in sleeve to a slightly smaller diameter when being inserted in a bore.

When the outside diameter of a clamp-in sleeve is relatively small, one speaks of a clamping pin.

The clamp-in sleeves are selected so that their outside diameter is somewhat greater than the inside diameter of the jacket, so that after insertion the clamp-in sleeves are clamped tight by their radial spring force. The clamp-on sleeves are selected so that their inside diameter is somewhat smaller than the diameter of the spindle, so that, having been slipped onto the spindle, the clamp-on sleeves are clamped tight thereon by their radial spring force.

Due to the fact that the diameter of the clamp-in sleeve is reduced and the diameter of the clamp-on sleeve increased, there occurs a compression of a rubber ring applied between these clamping sleeves, in radial direction. This results in a good coupling between the two clamping sleeves.

If the torque to be transmitted is great, the rubber ring may alternatively be vulcanized to the clamping sleeves.

Because of the use of sprung clamping sleeves and of the rubber ring, there are no high accuracy requirements for the dimensional tolerances of the spindle and of the jacket, so that e.g. for the jacket one can use commercial pipes. This has a very positive effect in reducing the cost of the roller according to the invention. The force required for mounting the clamping sleeves is small as compared with the forcing on of rigid sleeves.

The sleeves may alternatively have an undulated cross-section, so that the outwardly directed wave crests bear against the inner wall or surface of the jacket and the inwardly directed wave crests against the outer wall or surface of the spindle. The sleeves may have three or more undulations each.

The dimensions of these sleeves are selected so that the maximum outside diameter determined by the outwardly directed wave crests is somewhat greater than the inside diameter of the jacket and/or the minimum inside diameter determined by the inwardly directed wave crests is somewhat smaller than the spindle diameter. The sleeve, having been mounted, will then clamp both against the inner wall of the jacket and against the spindle.

The mounting can be facilitated by providing the jacket and the spindle with a beveled "searching" edge or by beveling the wave crests at one of the outer ends of the sleeve. In this form of realization according to the invention, the desired clamping is obtained by the use of a single element. It is, of course, within the scope of the invention to fill the spaces remaining between the jacket and the sleeve and/or between the spindle and the sleeve with appropriate rubber inserts wholly or partially.

Instead of concentric clamping sleeves, another possibility is to provide a rim of clamping pins between the jacket and the spindle. The diameter of these clamping pins is selected so that it is somewhat greater than the width of the annular space between the jacket and the spindle. In this case, the jacket is coupled with the spindle directly by the clamping pins, thus eliminating the rubber ring which, when using concentric clamping sleeves, connects the latter with one another. Three or more pins may be inserted, which can be held at equal distances from each other by a cage.

Embodiments of the roller according to the invention are illustrated in the drawing and explained more specifically in the following:

FIG. 1 shows an exploded view of a part of a transport roller in perspective;

FIG. 2 shows the left half of an assembled transport roller in perspective with parts broken away to show details of construction;

FIGS. 3a to 3d, depict side views of various forms of the clamping sleeves;

FIG. 4 shows the left half of another form of a transport roller in perspective with parts broken away to show details of construction, and;

FIG. 5 shows a transverse section of still another form of a transport roller.

The transport roller 1 comprises a tubular jacket 2 and a spindle 3. Jacket 2 is fastened on spindle 3 by a clamp-in sleeve 4 provided therein, by a clamp-on sleeve 5 provided concentrically to said clamp-in sleeve 4 on spindle 3, and by a rubber ring 6 clamped between said clamping sleeves 4 and 5.

A lengthwise slit 7 in these commercially available clamping sleeves 4 and 5 may be oriented parallel (FIG. 3a) or at an angle (FIG. 3b) to the longitudinal axis of spindle 3, or it may extend in the form of an arrow (FIG. 3c) or of a wave (FIG. 3d).

The rubber ring 6 is inserted into the clamp-in sleeve 4, while the clamp-on sleeve 5 is inserted into the rubber ring 6. Thereafter two such structures are pushed onto spindle 3 and into jacket 2 with the aid of a press, spindle 3 and jacket 2 having first been fixed in the proper relative position. Such a fastening element is thus mounted simultaneously on each of the two outer ends of jacket 2.

The rubber ring 6, which in mounting is clamped in radial direction between the two sleeves 4 and 5, brings about a good connection between the sleeves 4, 5 clamped in the jacket 2 and, respectively, on the spindle 3, so that by this connection a torque can be transmitted from jacket 2 to spindle 3 or vice versa.

Due to the sprung connection, large tolerances are acceptable, so that commercial pipes can be used for the jacket 2 and in the manufacture of the spindle 3 special precision need not be taken into consideration, as is the case e.g. with pure press-fits.

In the embodiment according to FIG. 4, an undulated sleeve 8 is inserted, which is made of spring steel. Sleeve 8 has four undulations and is dimensioned so that after assembly wave crests 9 directed radially outward are clamped against the inner wall of jacket 2 and wave crests 10 directed radially inward are clamped against spindle 3.

The use of an undulated sleeve with e.g. six undulations is equally conceivable. The wave troughs on the inside and/or outside of the sleeve may be filled with rubber.

In the embodiment according to FIG. 5, four clamping pins 12 are arranged in a ring in an annular space 11 between the jacket 2 and spindle 3. In the unassembled state, the clamping pins 12 have a diameter somewhat greater than the width of the annular space 11, to achieve the desired clamping. By a cage made of plastic, not shown, the clamping pins 12 are held at regular distances from each other, bars of the cage which engage in the slits in the clamping pins 12 securing said pins against rotation about their axis. The bars of the cage are oriented so that the radial central plane of each slit in the clamping pins 12 is tangential to a circle defined by the mean radius of the annular space 11.

The invention permits rapid assembly by means of cheap fastening means. Due to the use of sleeves 3, 4 respectively 8 or 12 sprung in radial direction, exact dimensional tolerances need not be maintained. As the connection between the jacket 2 and spindle 3 is somewhat flexible in radial direction, it is possible, in case one roller 1 interacts with a counter-roller, to achieve a uniform line contact between the two rollers over their entire length despite slight divergence of the spindle axes.

Having thus described the invention and illustrated its use, what is claim as new and is desired to be secured by Letters Patent is:

1. A transport roller or the like comprising a spindle, a tubular jacket surrounding and concentrically aligned with said spindle, said jacket having an inner circumferential portion, a coupling assembly operatively connecting said spindle and said jacket for conjoint rotation, while permitting limited radial movement between said jacket and spindle, said coupling assembly comprising a clamp-on split ring member seated on said spindle and exerting a radial inward force thereagainst, a clamp-in split ring member engaging said inner circumference portion of said jacket and exerting a radial outward force thereagainst, and an elastomeric annulus interposed between said split ring members, said annulus being in radial compressed condition.

* * * * *

UNITED STATES PATENT OFFICE
CERTIFICATE OF CORRECTION

PATENT NO. : 4,495,683
DATED : January 29, 1985
INVENTOR(S) : JOHANNES C. DELHAES It is certified that error appears in the above-identified patent and that said Letters Patent are hereby corrected as shown below:

On the cover page of the patent the lines numbered [73] should be rewritten as follows:

-- [73] Assignee: Rubber-En Kunststoffabriek Enbi B.V. Nuth, Netherlands --

Signed and Sealed this

Fifteenth Day of October 1985

[SEAL]

Attest:

DONALD J. QUIGG

Attesting Officer

Commissioner of Patents and Trademarks—Designate